United States Patent [19]
Haney

[11] Patent Number: 5,746,045
[45] Date of Patent: May 5, 1998

[54] LAWN MOWER WITH IMPROVED CLIPPING DISPERSAL

[76] Inventor: James Haney, 1431 Broadway, NW., Grand Rapids, Mich. 49504

[21] Appl. No.: 665,023

[22] Filed: Jun. 11, 1996

[51] Int. Cl.⁶ ................................................. A01D 34/70
[52] U.S. Cl. ..................................... 56/13.3; 56/16.6
[58] Field of Search ..................... 56/13.3, 16.6, 56/202, DIG. 8, 13.4, 16.9, 194, 14.5

[56] References Cited

U.S. PATENT DOCUMENTS

| | | |
|---|---|---|
| 2,843,991 | 7/1958 | Poehls . |
| 3,058,284 | 10/1962 | Anderson . |
| 3,316,696 | 5/1967 | Florido . |
| 3,496,977 | 2/1970 | Gifford . |
| 3,657,865 | 4/1972 | Ober . |
| 3,903,565 | 9/1975 | Hicks . |
| 3,906,709 | 9/1975 | Rhodes . |
| 3,925,968 | 12/1975 | Wagenhals ........................ 56/13.3 |
| 3,987,606 | 10/1976 | Evans . |
| 4,114,353 | 9/1978 | Ansbaugh et al. . |
| 4,193,249 | 3/1980 | Tackett . |
| 4,614,080 | 9/1986 | Hoepfner et al. . |
| 4,679,383 | 7/1987 | Quintel . |
| 4,700,534 | 10/1987 | Reilly . |
| 4,711,073 | 12/1987 | Freier, Jr. et al. . |
| 4,711,253 | 12/1987 | Anderson ........................ 56/13.3 X |
| 4,718,222 | 1/1988 | Lambert et al. . |
| 4,735,037 | 4/1988 | Benter . |
| 4,936,885 | 6/1990 | Samejima et al. . |
| 5,020,309 | 6/1991 | Hopkins ........................ 56/13.3 |
| 5,142,851 | 9/1992 | Lydy et al. . |
| 5,189,868 | 3/1993 | Hill . |

Primary Examiner—Terry Lee Melius
Assistant Examiner—Robert Pezzuto
Attorney, Agent, or Firm—Price, Heneveld, Cooper, DeWitt & Litton

[57] ABSTRACT

A lawn mower is provided having a chassis, a mower deck dependent from the chassis, having a chute for discharging clippings generally in a first direction onto the ground; and a blower assembly mounted to the chassis on the same side as the chute, and having an outlet oriented such that a stream of air from the blower extends along a second direction and intersects the clippings discharged from the chute in the first direction and redisperses the clippings over an area greater than that achieved by the mower deck alone.

7 Claims, 2 Drawing Sheets

LAWN MOWER WITH IMPROVED CLIPPING DISPERSAL

This invention relates to lawn mowers and particularly to lawn mowers wherein clippings and cuttings are discharged from the side of the lawn mower onto the ground.

It is well-known that it is often desirable to collect lawn clippings in a bag or other container directly from the discharge chute of the cutting deck to avoid unsightly thatch buildup and clumps of clippings on the lawn. However, the catching of grass clippings requires extra time and expense in their disposal. As an expedient, many have dispensed with the collection devices and opted to discharge the clippings directly on the ground. Because of safety concerns, the discharge chutes of most mowers are deflected downward to reduce the risk of objects being projected therefrom and injuring person or property. As a result, the clippings are dispersed in an area close to the mower, causing clumping and sheeting the lawn. To avoid the clumping and sheeting of grass clippings, the lawn is often cross cut or mowed a second time at an angle to the first for the purpose of redistributing the grass clippings over the lawn. However, this process may need to be repeated several times to achieve an acceptable distribution. In the end, almost as much time has been spent as if the clippings had been collected. It is the purpose of this invention to provide a lawn mower wherein clippings may be discharged onto the lawn and dispersed over a much greater area than that achieved previously and in a manner such that the clippings do not clump.

SUMMARY OF THE INVENTION

The lawn mower embodying the invention includes a chassis, a mower deck dependent from the chassis and having a chute for discharging the clippings out one side generally in a first direction, and a blower assembly mounted to said chassis on a side coincident with said chute and having a blower outlet oriented such that a stream of air from the blower intersects the stream of clippings discharged from the chute.

In accordance with another form of the invention, it is contemplated that the blower assembly may be rotated about either one or both of a vertical and/or horizontal axis to position the stream of air discharged from the blower assembly. In this manner, the location of the air stream from the blower assembly can be optimized to intersect the stream of clippings from the mower for redistribution.

The advantages offered by the invention include a savings associated with the time spent not cross cutting the lawn or emptying canisters or bags capturing the clippings. Furthermore, the fine redistribution of the clipping reduces the need for manual raking or power sweeping of the yard. Moreover, the fine redistribution of the clipping returns to clippings as a mulch, providing a healthier yard. These and other advantages will be readily apparent in referencing the attached drawing figures in association with the description of the invention.

BRIEF DESCRIPTION OF THE DRAWING FIGURES

DETAILED DESCRIPTION OF THE VARIOUS EMBODIMENTS

Figure 1:
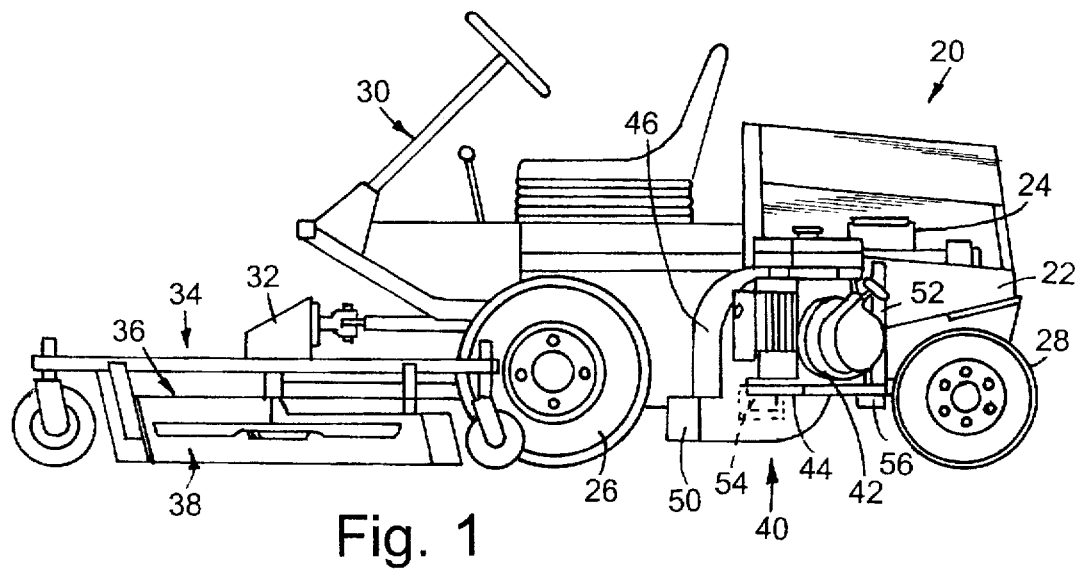
FIG. 1 is a side elevation view of a riding lawn mower.

Referring now to the drawing figures, there is shown a riding lawn mower 20 such as, for example, a Grounds-Master 327 available from TORO. Mower 20 includes a chassis 22 configured to receive an engine 24 and a transmission (not shown) for providing power to wheels 26. A second set of wheels 28 at the back of the chassis are steerable by way of a steering wheel and column assembly 30, at the front.

Supported from the front of the chassis 22 and interconnected to engine 24 by way of a power take-off 32, is a mower deck assembly 34. Deck assembly 34 includes one or more conventional mower blades (not shown) for cutting grass or other vegetation. The clippings or cuttings are discharged out one side 36 of the mower deck through a chute or opening 38. Chute 38 may include a conventional deflector (not shown) for directing debris ejected therefrom in a downward direction in order to reduce the risk of injury from any projectiles. With or without the deflector, the velocity of clippings exiting chute 38 is only sufficient to carry the clippings five to eight feet laterally from the mower. As a result, particularly when the grass is long or damp, the clippings are too heavy to be discharged evenly and they often gather or clump adjacent the chute 38, leaving an unsightly trail.

Figure 3:
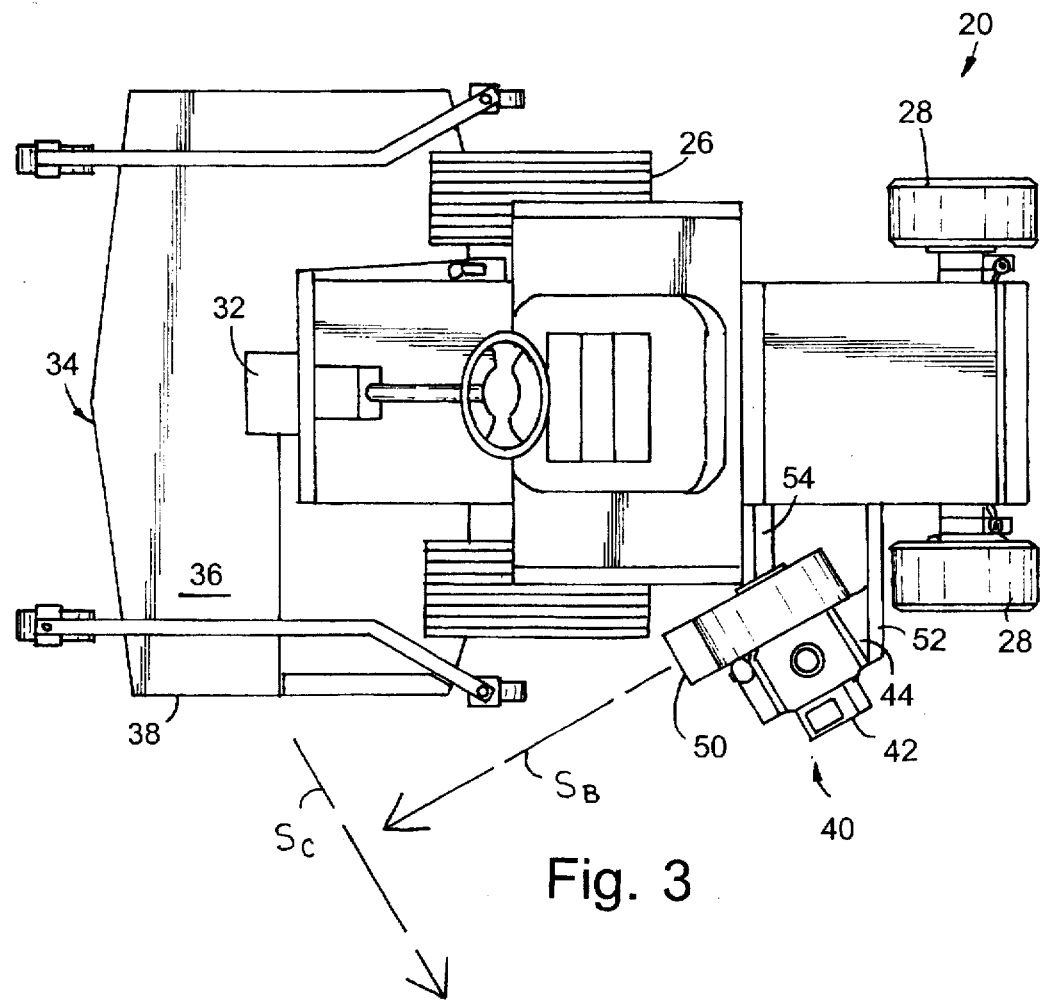
FIG. 3 is a plan view of a riding lawn mower.
Figure 2:
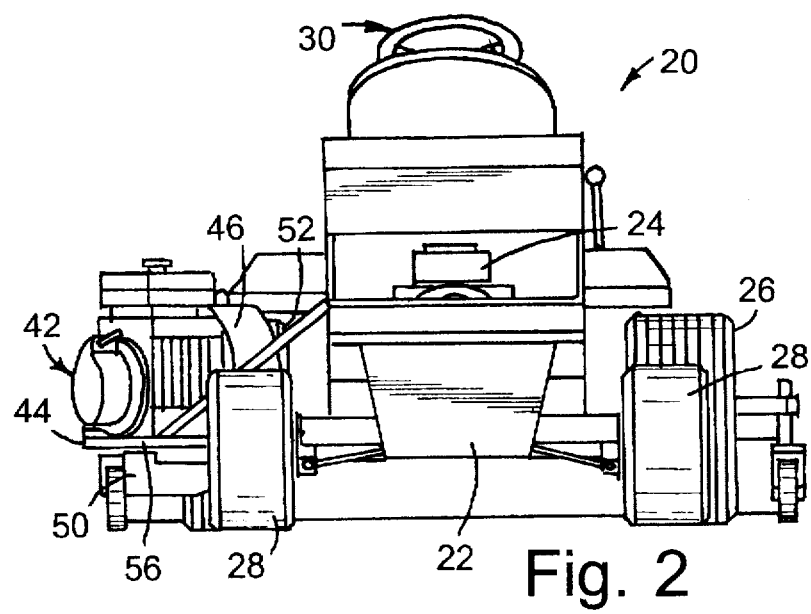
FIG. 2 is a back elevation view of a riding lawn mower.
Figure 4:
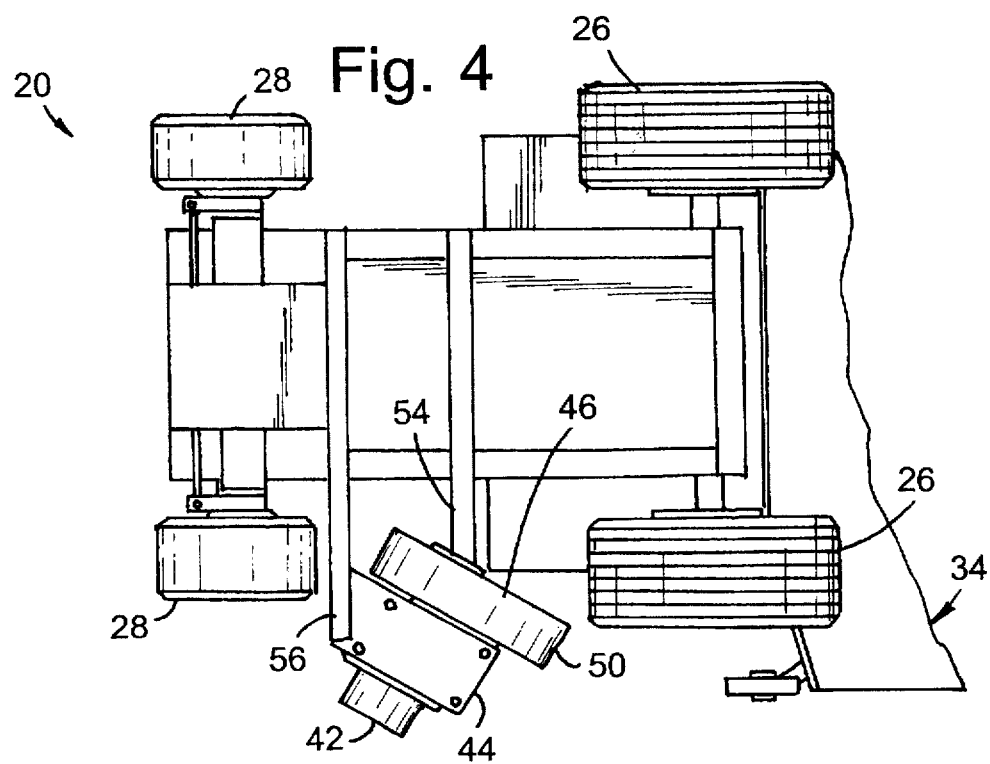
FIG. 4 is a bottom view illustrating attachment brackets for the blower assembly.

To better disperse clippings discharged from chute 38, a blower assembly 40 is mounted to mower 20, preferably at a location such that the stream of air $S_B$ from the blower assembly 40 intersects the stream of clippings $S_C$ from the chute 38 with a velocity sufficient to entrain the clippings in stream $S_B$ and distribute them over a larger area than that produced or achieved from the chute 38 alone. In a preferred embodiment as shown in FIGS. 1–5, blower assembly 40 is located and support on chassis 22 by one or more support members described below.

Blower assembly 40 includes an engine 42, such as a Briggs & Stratton Model Series 135200, 136200, or I/C Model Series 133200 or similar engine, retained on a platform or engine mount 44. A shaft of the engine 42 is connected to a blower rotor (not shown) enclosed within a housing 46, also attached to engine 42. Housing 46 includes an intake 48 disposed generally in a central portion of one side of the housing. A discharge 50 is also provided tangentially along the circumference of the housing as is well-known.

The blower assembly 40 is dependent from chassis 22 by way of a number of support members 52, 54, and 56. Supports 52–56 are preferably angle iron brackets interconnecting support 44 to chassis 22. The type of connection between brackets 52–56, support 44, and chassis 22 may vary, including bolted connectors, hooks, and welded joints. It is contemplated that additional brackets or braces may be attached to the engine 42 or blower housing 46 for additional support. Ideally, it is contemplated that the vertical and horizontal angular orientation of the blower housing 46 may be variable in order to adjust the angle the stream of air $S_B$ existing discharge 50 with respect to the stream of clippings $S_C$ thrown from the chute 38. Such adjustability permits the operator to maximize the effectiveness of the blower stream $S_B$ to pick up and entrain the grass clippings and redistribute them over the ground. In a preferred embodiment, it is desirable to orient the air stream $S_B$ such that it intersects the clipping stream $S_C$ just prior to the impact of clipping stream $S_C$ with the ground such that generally most of the clippings are captured by air stream $S_B$ and accelerated in a second direction and at a greater velocity than that produced by the mower deck. In this way, the clippings are redistributed over a larger area and clumping and piling of the cuttings is reduced if not avoided. It is further contemplated that since the air stream $S_B$ is not well focused, clippings on the ground may also be entrained in the stream and redistributed.

The configuration described above is simply operated. Riding mower 20 is operated in a conventional manner. Simultaneously, the operator starts engine 42 which operates the blower in housing 46 to produce the air stream $S_B$. As the lawn is cut, clippings are discharged from chute 38 in a first direction generally to the side of mower 20. As the mower traverses the grounds, blower assembly 40 produces a second stream of air $S_B$ which intersects the clippings stream $S_C$ and redirects the clippings in a second direction at a higher velocity. The redirection of a majority of the clippings and the different velocities at which each clipping is accelerated, results in a redistribution of the clippings in an arc substantially greater than that achieved in the discharge from chute 38 alone. As a result, the clippings are redistributed over a greater area resulting in lesser density distribution which, in turn, reduces clumping of the clippings.

Although this concept has been described with specific reference to a riding mower, the invention works equally as well as walk-behind mowers, such as the Series 102000 available from ExMark Manufacturing Company, Inc., of Nebraska. Moreover, similar modifications can be made to the smaller home mowers available from Snapper and Toro.

In the foregoing description, it will be readily perceived by those skilled in the art that modifications may be made without departing from the concepts disclosed herein. Such modifications are to be considered included in the following claims, unless the claims by their language expressly state otherwise.

I claim:
1. A lawn mower, comprising:
   a chassis;
   a mower deck assembly dependent from said chassis and having a chute for discharging clippings generally along a first axis; and
   a blower assembly mounted to said chassis on a side coincident with said chute so as to not physically contact the grass clippings discharged from said chute, said blower having an outlet oriented such that a stream of air from said blower is blown onto the ground in an area where said chute would otherwise dispense the discharged grass clippings so as to intersect the clippings discharged along said first axis for dispersing the clippings on the ground along a second axis.

2. The lawn mower as defined in claim 1, wherein said blower is mounted on said chassis a distance apart from said chute.

3. The lawn mower as defined in claim 1, wherein said first axis is substantially perpendicular to said second axis.

4. A lawn mower assembly comprising in combination:
   a mower chassis supporting an engine and having a front, a back, and opposing sides;
   a mower deck dependent from said mower chassis and having at least one blade for cutting vegetation and discharging clippings of said vegetation from a side thereof; and
   a blower assembly dependent from said mower chassis on one of said opposing sides coincident with said side of said mower deck so as to not physically contact the grass clippings discharged from said mower deck, said blower directing a stream of air at the ground in an area where said mower deck would otherwise dispense the discharged grass clippings so as to entrain the clippings discharged from said mower deck and dispersing the clippings over an area of the ground greater than that achieved when discharged from said mower deck.

5. The lawn mower as defined in claim 4, wherein said blower assembly is mounted on said chassis a distance apart from said chute.

6. A lawn mower accessory for increasing the ground area over which discharged grass clipping are dispersed, said accessory comprising:
   a blower having a nozzle from which air is blown; and
   a mounting structure adapted for mounting said blower on a lawn mower in a location where said blower itself does not come into contact with the grass clippings discharged by the lawn mower, and where air from said blower is directed at the ground in an area where the lawn mower would otherwise dispense the discharged grass clippings so as to blow the discharged grass clippings over a greater area of the ground.

7. A lawn mower comprising:
   a chassis;
   a mower deck mounted to said chassis for discharging grass clippings onto the ground; and
   a blower mounted to said chassis so as to not physically contact the grass clippings discharged from said mower deck, for blowing air onto the ground in an area where said mower deck would otherwise dispense the discharged grass clippings so as to dispense the grass clippings over a greater area of the ground.

* * * * *